United States Patent
Ayyagari et al.

(10) Patent No.: US 11,126,769 B2
(45) Date of Patent: Sep. 21, 2021

(54) UNIFIED MATERIAL-TO-SYSTEMS SIMULATION, DESIGN, AND VERIFICATION FOR SEMICONDUCTOR DESIGN AND MANUFACTURING

(71) Applicant: Applied Materials, Inc., Santa Clara, CA (US)

(72) Inventors: Bhuvaneshwari Ayyagari, Cupertino, CA (US); Angada Bangalore Sachid, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/781,980

(22) Filed: Feb. 4, 2020

(65) Prior Publication Data

US 2021/0240896 A1 Aug. 5, 2021

(51) Int. Cl.
*G06F 30/3308* (2020.01)
*G06F 30/20* (2020.01)

(52) U.S. Cl.
CPC .......... *G06F 30/3308* (2020.01); *G06F 30/20* (2020.01)

(58) Field of Classification Search
CPC .......... G06F 30/20; G06F 30/27; G06F 30/31; G06F 30/33; G06F 30/3308; G06F 30/367; G06F 2219/18
USPC ....................................................... 716/106
See application file for complete search history.

(56) References Cited

U.S. PATENT DOCUMENTS

| | | |
|---|---|---|
| 6,622,059 B1 | 9/2003 | Toprac et al. |
| 2002/0193899 A1 | 12/2002 | Shanmugasundram et al. |
| 2004/0103381 A1 * | 5/2004 | Shinomiya ............. G06F 30/36 716/106 |
| 2005/0076316 A1 * | 4/2005 | Pierrat ................... G06F 30/367 716/52 |
| 2015/0006097 A1 | 1/2015 | Gao et al. |
| 2016/0342719 A1 * | 11/2016 | Reid ..................... G06F 30/367 |
| 2017/0060001 A1 | 3/2017 | Adel et al. |

FOREIGN PATENT DOCUMENTS

JP 2009-021378 A 1/2009

OTHER PUBLICATIONS

International Search Report and Written Opinion dated Apr. 15, 2021 in International Patent Application No. PCT/US2020/065220, 6 pages.

* cited by examiner

*Primary Examiner* — Paul Dinh
(74) *Attorney, Agent, or Firm* — Kilpatrick Townsend & Stockton LLP (57) ABSTRACT

A complete, unified material-to-systems simulation, design, and verification method for semiconductor design and manufacturing may include evaluating effects of semiconductor material or process changes on software algorithms. The method may include translating the material or process change into a database of characteristics; generating primitive circuit structures using the database of characteristics; performing an electrical characterization of the primitive circuit structures; providing an output of the electrical characterization to a script to generate compact models; generating a lite version of standard cells; generating a digital system based on the lite version of the standard cells; and evaluating a performance of a software algorithm on the digital system to determine an effect of the material or process change for the semiconductor manufacturing process.

20 Claims, 6 Drawing Sheets

UNIFIED MATERIAL-TO-SYSTEMS SIMULATION, DESIGN, AND VERIFICATION FOR SEMICONDUCTOR DESIGN AND MANUFACTURING

BACKGROUND

Circuit architectures over the past several decades have used scaling techniques to meet the demands of ever-increasing workloads. Scaling traditionally reduces the feature size of integrated circuit elements (e.g., from 10 nm, to 7 nm, to 5 nm, and so forth). However, the physical limitations of silicon structures have dramatically slowed the gains that may be made from scaling techniques in recent years as the limitations of physics are reached. Additionally, with the recent emergence of artificial intelligence and machine learning algorithms (AWL), the amount of data to be processed and the diversity of different workload types are beginning to overtake the gains that can be made by scaling technologies. The hardware compute requirements are growing exponentially, and new circuit fabrication advances may be required to maintain this pace. Therefore, the increasing processing demands from AI/ML technologies, combined with the decreasing performance gains realized through traditional circuit scaling may require alternative techniques to improve performance.

SUMMARY

In some embodiments, a complete, unified material-to-systems simulation, design, and verification method for semiconductor design and manufacturing may include evaluating effects of semiconductor material or process changes on software algorithms. The method may include translating the material or process change into a database of characteristics; generating primitive circuit structures using the database of characteristics; performing an electrical characterization of the primitive circuit structures; providing an output of the electrical characterization to a script to generate compact models; generating a lite version of standard cells; generating a digital system based on the lite version of the standard cells; and evaluating a performance of a software algorithm on the digital system to determine an effect of the material or process change for the semiconductor manufacturing process.

In some embodiments, a system may include one or more processors and one or more memory devices. The one or more memory devices may include instructions that, when executed by the one or more processors, cause the one or more processors to perform operations including receiving a material or process change for a semiconductor manufacturing process; translating the material or process change into a database of characteristics; generating primitive circuit structures using the database of characteristics; performing an electrical characterization of the primitive circuit structures; providing an output of the electrical characterization to a script to generate compact models; generating a lite version of standard cells; generating a digital system based on the lite version of the standard cells; and evaluating a performance of a software algorithm on the digital system to determine an effect of the material or process change for the semiconductor manufacturing process.

In some embodiments, a non-transitory computer-readable medium may include instructions that, when executed by one or more processors, cause the one or more processors to perform operations including receiving a material or process change for a semiconductor manufacturing process; translating the material or process change into a database of characteristics; generating primitive circuit structures using the database of characteristics; performing an electrical characterization of the primitive circuit structures; providing an output of the electrical characterization to a script to generate compact models; generating a lite version of standard cells; generating a digital system based on the lite version of the standard cells; and evaluating a performance of a software algorithm on the digital system to determine an effect of the material or process change for the semiconductor manufacturing process.

In any embodiments, any of the following features may be implemented in any combination and without limitation. The primitive circuit structures may include a transistor. Performing the electrical characterization of the primitive circuit structures may include generating current and voltage characteristics for the transistor. The method/operations may also include performing a TCAD simulation of the primitive circuit structures; generating circuit models of the primitive circuit structures using the database of characteristics and the TCAD simulation; performing a circuit simulation of the circuit models; and/or determining that the material or process change for the semiconductor manufacturing process is acceptable based on results of the circuit simulation of the circuit models. The method/operations may also include receiving a plurality of material or process changes for the semiconductor manufacturing process; translating the plurality of material or process changes into the database of characteristics; generating additional primitive circuit structures using the database of characteristics for each of the plurality of material or process changes; simulating the additional primitive circuit structures; and identifying acceptable material or process changes in the plurality of material or process changes based on results of simulating the primitive circuit structures. The primitive circuit structures may include a memory film stack. The lite version of the standard cells may include a memory array. The compact models may include a ring oscillator. The method/operations may also include testing a performance of the ring oscillator to determine PPAC characteristics; and determining that the performance of the ring oscillator is acceptable before generating the lite version of the standard cells. The lite version of the standard cells may omit features that are not required for the digital system. The software algorithm may include an AI/ML algorithm. The method/operations may also include generating a lite version of a Process Design Kit (PDK) using the lite version of the standard cells. Cells in the PDK may use abstracted values extracted from the database of characteristics. The lite version of the PDK may include only cells that are affected by the material or process change for the semiconductor manufacturing process. The digital system may be a processor. The method/operations may also include conducting at least two short-loop optimization tests before generating the digital system to test PPAC characteristics of the primitive circuit structures and the lite version of the standard cells.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an FIG. 1 illustrates a process flow of different operations that may be performed to evaluate how we change to a material or process affects full electronic circuit systems, according to some embodiments.

DETAILED DESCRIPTION

Circuit architectures over the past several decades have used scaling techniques to meet the demands of ever-increasing workloads. Scaling traditionally reduces the feature size of integrated circuit elements (e.g., from 10 nm, to 7 nm, to 5 nm, and so forth). However, the physical limitations of silicon structures have dramatically slowed the gains that may be made from scaling techniques in recent years. Additionally, with the recent emergence of artificial intelligence and machine learning algorithms (AI/ML), the amount of data to be processed and the diversity of different workload types are beginning to overtake the gains that can be made by scaling technologies. Hardware compute requirements are growing exponentially, and new circuit fabrication advances may be required to maintain this pace. Therefore, the increasing processing demands from AWL technologies, combined with the decreasing performance gains realized through traditional circuit scaling may require alternative techniques to improve performance. One such alternative technique for improving performance is materials/process innovation by equipment manufacturers.

Materials innovation includes, for example, any change to the various physical aspects of a semiconductor device, such as the size of a source/drain contact, types of isolation between transistors, gate oxide materials, work function metals, doping in source/drain regions, contact materials, liners in the contact materials, and/or any other parameters of a semiconductor device. The impact of these types of changes on large processors and/or Systems-on-Chip (SoCs) with different software algorithms may not be clear at the early stage of the semiconductor design cycle. For example, the Power-Performance-Area-Cost (PPAC) improvements of the material engineering innovation may seem small, but may be multiplied dramatically at an SoC level, or vice-versa.

Despite the promising gains that may be made by materials innovation, difficulties and inherent limitations with existing tools, processes, and systems make material innovations difficult to realize in practice without an extensive, multi-year design validation process. Because of the complexity inherent in designing, testing, implementing, and producing complex circuit-based systems, the design process has traditionally been split between different entities in the semiconductor ecosystem. For example, a material or process change at the semiconductor level would be introduced using by an equipment manufacturer. The material change would then later be implemented in simple device structures with compact models at a semiconductor fabrication plant or foundry. Process design kits (PDKs), Standard Cells libraries, and embedded memories for a process design kit (PDK) were developed by integrated circuit design entities providing electronic design automation (EDA) software. The standard cells/memories in the PDK we used by a "fabless" device design entities or integrated device manufacturers (IDMs) to generate block level designs, full SoCs, and system-level devices. Finally, software designers would use the manufactured IC devices to run complex software designs and algorithms. Each of these different stages of the IC design and manufacturing pipeline was executed by different entities, each of which used different software/hardware tools to perform their portion of the process.

Currently, there is very little connectivity between the different stages in this process. For example, simple devices and/or compact models designed by the foundry are tested against their own internal benchmarks to determine that the corresponding simple circuit device meets their technical requirements. The simple devices and/or compact models would then be passed to the integrated circuit (IC) design entity, which would use the compact models to design full PDK, Standard Cells, and memory cells for the EDA software. Again, the IC design entity would test the standard cells against their own internal technical requirements. Finally, the standard cells would be used to design full IC systems, which would again be tested against their own software benchmarks. Because of the lack of connectivity between each of the different entities and software/hardware tools, it was impossible to know the full ramifications of a process or material change made by an equipment vendor as that change propagated through the semiconductor ecosystem to full AWL systems.

Note that the lack of connectivity between the various portions of the IC design and manufacturing process is the result of technical problems rather than business requirements. Existing software/hardware tools do not support the integration of these different processes into a single workflow that can be implemented by a single computer system. The embodiments described herein help solve this and other technical problems by providing linking software tools between the various stages of the existing IC design and manufacturing process. The embodiments described herein also alter existing design tool flows such that they can rapidly implement and test the small changes to materials or processes without requiring the design of complete libraries of standard cells and memory arrays. Finally, the embodiments described herein dramatically reduce the time it takes to evaluate a material/process change by aggregating each stage of the process—from materials to full systems—into a single software workflow. This combination of advantages provided by these embodiments reduces the previous multi-year process for evaluating material/process changes at the equipment manufacturer down to days or weeks at most.

Figure 1:
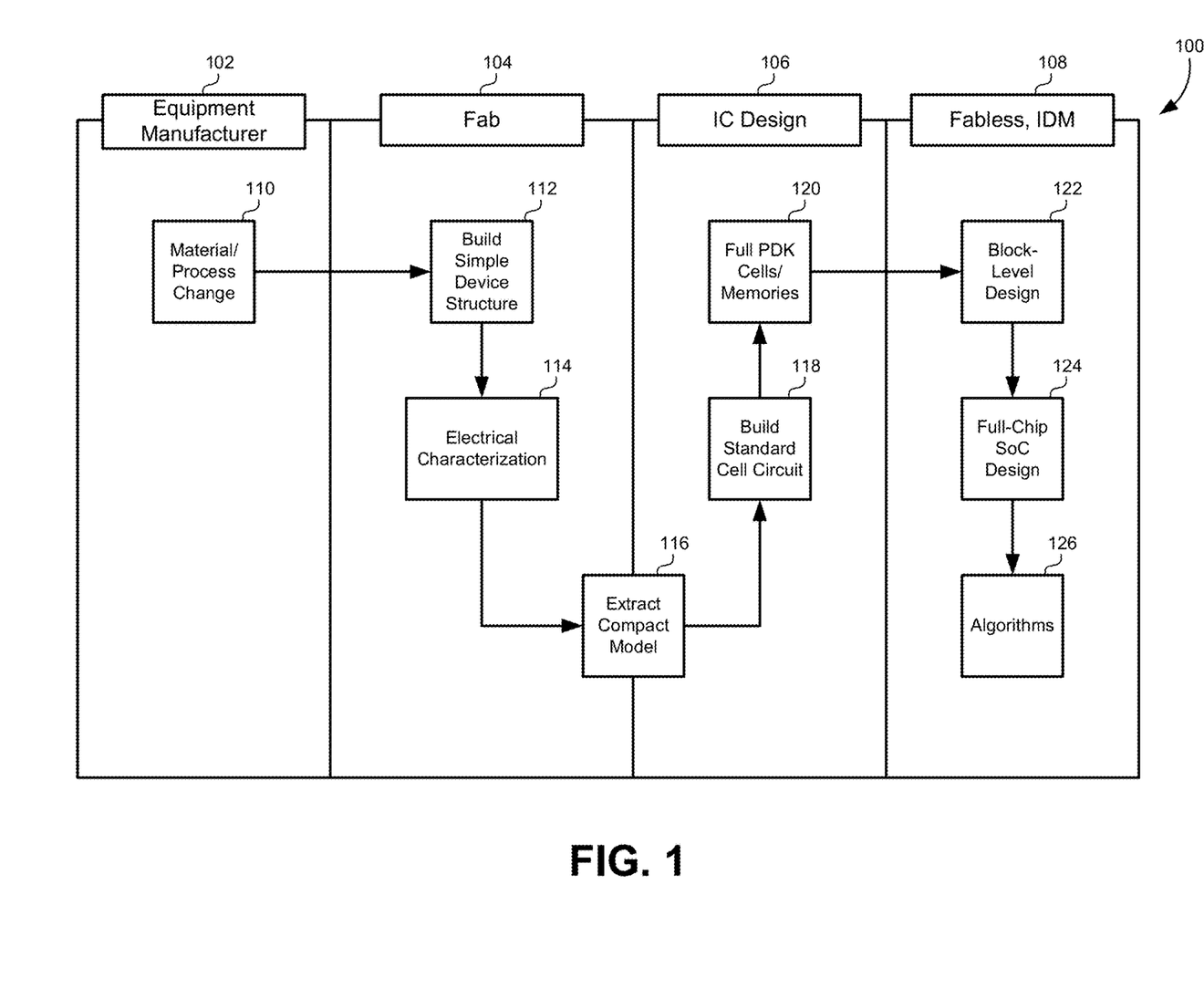

FIG. 1 illustrates a process flow of different operations that may be performed to evaluate how a change to a material or process affects full electronic circuit systems, according to some embodiments. A first entity involved in the process may include a semiconductor equipment manufacturer ("equipment manufacturer") 102, which designs equipment for manufacturing electronic circuits on semiconductor wafers. One example of an equipment manufacturer 102 may include Applied Materials®. Generally, the equipment manufacturer 102 may make material/process changes to alter how the equipment manufacturers a semiconductor device. These changes may include any change to the various physical aspects of a semiconductor device, such as the size of a source/drain contact, types of isolation between transistors, gate oxide materials, work function metals, doping in source/drain regions, contact materials, liners in the contact materials, and/or any other parameters of a semiconductor device. Note that in the process flow of FIG. 1, the equipment manufacturer 102 could institute material/process changes 110, but would not typically understand the downstream effect of those material/process changes 110 until the other entities and software/hardware tools performed their corresponding operations as described below. While the equipment manufacturer 102 could test the material/process change, it could only validate the consequences of the change at a very small scale level for individual features or small devices. The equipment manufacturer 102 had no software/hardware tools for evaluating the consequences of the material/process change 110 at the system-level, particularly for chip system running AWL software.

Next, the device fabricator 104 (i.e., the foundry) that purchases equipment from the equipment manufacturer 102 would design simple device structures 112 to be used on the semiconductor manufacturing equipment for designing full semiconductor systems. These simple device structures 112 may include circuit designs and layouts for transistors, diodes, capacitors, and other semiconductor devices. The device fabricator 104 would then test the electrical characteristics of these individual devices. For example, the equipment manufacturer 102 generally tests feature parameters, such as the resistance of a via, the on-current of a transistor, and other relatively small-scale measurements for individual semiconductor devices. Generally, these tests could include both hardware tests and Technology Computer-Aided Design (TCAD) software tests that automate and model semiconductor fabrication and semiconductor device operation. TCAD tools can model both process steps and the behavior of electrical devices based on the fundamental physics of the semiconductor layout. The device fabricator 102 may also create compact models 116 (such as SPICE transistor models) of the semiconductor devices that capture the behavior of the simple device structures for use in designing larger circuits that use the semiconductor devices.

After the compact models 116 are generated, the compact models 116 can be used to build a circuit for a standard cell. This step may be executed by the device fabricator 104 and/or the integrated circuit design entity 106. These two entities may work together or may individually handle different portions of the steps that are assigned to the IC design entity 106 in FIG. 1. For example, when combining compact models of individual transistors together, additional aspects of the circuit performance may be impacted based on the connections between these transistors. Capacitances and dielectrics are formed between compact model transistors as they are combined together into a larger, multi-transistor circuit. At this level, the standard circuits 118 can be designed in the EDA software and tested at the circuit level rather than at the transistor level. For example, standard circuits 118 can be benchmarked against power consumption, frequency, and/or other simple electrical characteristics. As described above, material/process changes 110 may affect the operation of the standard circuits 118, but these effects would not be discovered until the material/process changes 110 had propagated down to the IC design entity 106 during simulation and use of the EDA software, SPICE simulations, etc.

One of the most time-consuming aspects of the process was generating full PDK libraries and standard cells/memories. The PDK libraries may include symbols, device parameters, parametric cells, design rules, layout versus schematic rules, electrical rules, layers, and so forth. When the material/process changes 110 were made by the equipment manufacturer 102, the PDK libraries 120 comprising standard circuit elements and cells are generally redesigned by the device fabricator 104 and/or IC design entity 106. This is a time-consuming process because the PDK guarantees that designs created in the EDA software may be fabricated by the device fabricator 104 at a predetermined yield.

Finally, system design entities 108 can design and run large circuit systems using the PDK. The system design entities 108 may include fabless design shops that design circuit-based systems for fabrication at the fabrication entity. Additionally, an integrated device manufacturer (IDM) may include a semiconductor company that designs, manufactures, and sells integrated circuit products. Various design tools may be used by any of these system design entities 108 to design block-level designs 122, including processors, memory blocks, multiply-accumulators (MACs), digital signal processors (DSPs), and other design blocks. These design blocks may be tested to determine whether the performance, power, area, and/or cost requirements (PPAC) have been met. The system design entities 108 may also design full SoC designs 124 that integrate multiple design blocks into a single on-chip system. The full SoC designs 104 can also be tested to meet the PPAC requirements. In some cases, the full SoC designs 124 can also be tested as software algorithms 124 are run on the fabricated chips. The speed and efficiency of the software algorithms 126 may then be used to make a final determination as to whether the material/process changes 110 were effective.

Because the process illustrated above in FIG. 1 may take multiple years to fully evaluate the material/process changes 110, the embodiments described herein describe a single-workflow system such that the equipment manufacturer 102 can evaluate the effect of the material/process changes 110 on the full SoC 124 and/or algorithms 126 in a matter of days or weeks rather than a matter of years. Some existing software tools may be used, but additional scripts have been designed to link these tools together, and a new process reduce the number of PDK components and standard cells that need to be designed to perform this evaluation.

Figure 2:
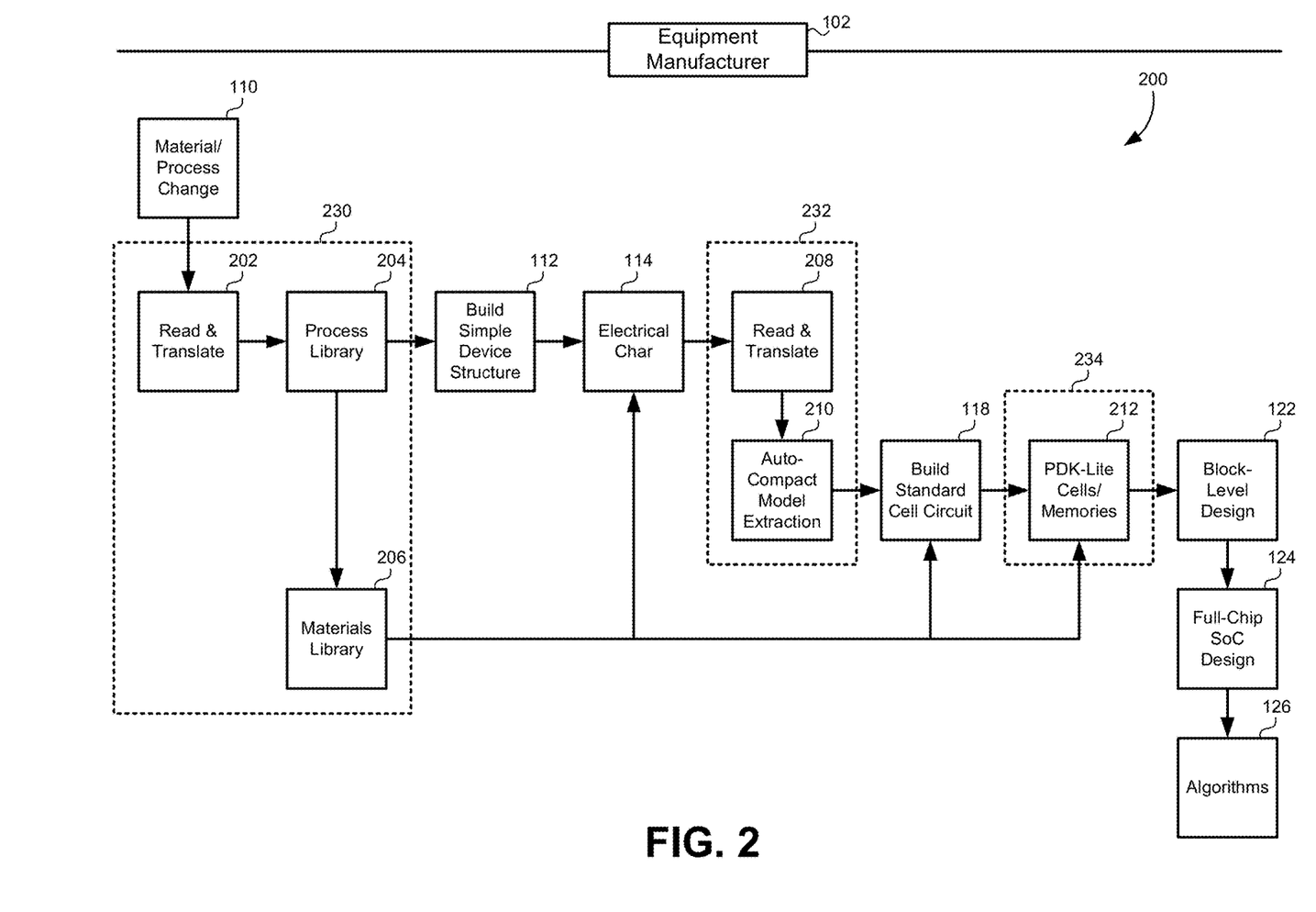
FIG. 2 illustrates a unified process flow of operations that may be performed in a single workflow to evaluate how a change to a material or process affects full systems, according to some embodiments.

FIG. 2 illustrates a unified process flow 200 of operations that may be performed in a single workflow to evaluate how a change to a material or process affects full systems, according to some embodiments. This process flow 200 is similar to the process flow 100 illustrated above in FIG. 1. However, process flow 200 is executed by a single workflow executed by a single entity. Instead of passing off designs between different software tools that are operated at different locations, different computer systems, and by different entities; these embodiments execute each of the operations as part of a single workflow such that the entire process can be executed by a single entity and/or single computer system. This reduces the time it takes to perform a full material-to-system evaluation of material/process changes 110 from years down to weeks or days.

Process flow 200 also includes additional blocks 230, 232, 234 that add new processes to the method that enable the various tools/processes to be operated as part of a single workflow performed by the equipment manufacturer 102.

After the material/process change 110 has been implemented, the new processes in block 230 may be executed. First, the method may read and translate 202 the material/process changes 110 to generate a database comprising a process library 204 and/or a materials library 206. For example, some embodiments may store material/process information in table. The system may read and translate 202 the table and extract process changes from the spreadsheet or table that had been made during a current design iteration. The read and translate process 202 can characterize material by extracting all of its relevant properties, such as those resulting from changes related to processes and those resulting from changes relating to materials. The process information may include information related to the specific technology node, the specific device, transistor type, transistor parameters, material thicknesses, features lengths, channels, and/or the like. The material information may include materials used in the device, liner types/materials, material resistivities, material properties, and/or other properties. This information may be stored in the process library 204 and/or the materials library 206. The process library 204 and/or the materials library 206 may be built upfront at the beginning of the process, and they may be used throughout the remainder of the process. The process library 204 and/or the materials library 206 may be stored in a database that acts as a lookup function for use by later steps in the process.

The information in the database can be referenced later by various stages of the process to fill in the missing parameters that are used to build models. When building the simple device structures 112, the system can use a number of prebuilt, previously defined structures with missing parameters. The process can then query the database containing the process library 204, and the materials library 206 may function as a lookup table to extract the relevant parameters that can then be plugged into the simple device structures. The simple device structures may include lines, vias, simple transistors, and so forth, that are used to build the simple device structures described above. The simple device structures may also be referred to as "primitive" device structures, or primitive circuit structures. Note that some embodiments use logic devices, while other embodiments may use memory devices. For memory embodiments, the simple device structures may include a memory film stack.

After simple devices are constructed and the electoral characteristics 114 may be extracted. As described below in relation to FIG. 4, TCAD models and/or SPICE models may be generated from the characteristics extracted from the database, and these models may be simulated to generate electrical characteristics 114 for the simple device structures. At this stage, a first evaluation can be made as to how the material/process change 110 has affected the electoral characteristics 114. If the effect has been negative, then different material/process changes may be used instead, and the process may start over using these different material/process changes.

A second new processing block 232 may include new processes for translating the simple device structure into compact models that can be used to build the standard cell circuit 118. For example, if a 7 nm transistor of a specific type, made from a specific materials is specified, these parameters can be provided as inputs to the database to look up relevant parameters to be inserted in the device model. Additionally, the electrical characteristics 114 may be fed into this process for generating the compact models. The values provided may be approximate compact model extractions. Therefore, the read and translate process 208 may extract the information from the materials library 206 in the database and/or the electrical characteristics 114, and translate that information to the values needed to build compact models for the corresponding device types. This may include translating the properties from the database into approximate values required for the compact models. The translation process may be designed differently for each specific tool used to generate the compact models, and may comprise translating the data in the database and the electrical characteristics 114 into values and formats that are readable by the particular tool. At this point, compact models can be automatically extracted 210 for use in building the standard cell circuit 118. As described above, the standard cell circuit 118 may include a NAND gate, an inverter, and/or any other simple circuit construct.

At this stage in the automated process, the system can build the standard cell circuit 118 and evaluate the performance of the standard cell circuit 118. The entire process up to this point may be automated such that the material/process change 110 propagates all the way through to the standard cell circuit 118. The standard cell circuit 118 can then be processed to measure the PPAC characteristics of the cell(s) 118 and determine whether the process/material change 110 has positively or negatively affected the operating characteristics of the standard cell 118. For example, the oscillation frequency and power usage of a ring oscillator may be tested at this point to determine whether the material/process change 110 has positively or negatively affected these operating characteristics. If the effect is positive, the rest of the process may continue, while if the process is negative, the process may be stopped and different material/process changes 110 may be used. For embodiments using memory devices, a memory array may be constructed and measured instead of a ring oscillator or other logic devices.

After the standard cell is tested, a "lite" version of the PDK library may be generated. The previous accepted process for generating PDK libraries was very manual and time-consuming. The embodiments described herein using automated process wherein abstracted values for a given technology can be used to generate "lite" versions of only the elements of the PDK library that are affected by the material/process change 110. For example, "abstracted" values can be derived by considering a process condition or a sequence of process steps (e.g., lithography, etch, deposition, etc.) to be abstracted as a set of design rules (e.g., tip-to-tip, enclosure rules, etc.). These abstracted and compacted values may be used in a way such that there is no loss of accuracy in the simulation. These values can be abstracted, compacted, and/or propagated to each subsequent stage. The values that are abstracted and compacted very according to the different stages of execution. For example, material/process changes at the materials level may be abstracted to represent resistivity versus thickness. At the small structure or transistor level, these values may then be abstracted as UV and C/V characteristics. Next, at the standard cell level, the abstracted values may be used to generate cell characteristics, such as function, power, drive strength, fan-out, and so forth. Finally, when the PDK-lite library is generated, these abstracted values may generate relevant design rules, such as spacing between lines, tip-to-tip spacing, and so forth. At each stage, these abstracted values may be stored in the material/process database as they are generated and inserted into models and simulations. The standard cell and PDK characteristics may be captured in the standard cell-lite and PDK-lite definitions, and/or may be captured in the material/process database.

For example, the previous process for generating a PDK library involved a foundry moving from a different technology node, such as moving from 7 nm to 5 nm. The foundry would begin with the previous version of the PDK at 7 nm with all of its associated overhead. It should also be noted that the version of the PDK at 7 nm was likely layered on top of a previous PDK library at 10 nm, such that each additional iteration of the PDK library adds additional layers and/or design rules to an existing library. From the 7 nm PDK, the foundry would manually take results from physics experiments to shrink certain parameters in the cell libraries. The foundry would then communicate with the EDA vendors to integrate the new PDK libraries with the new technology. Months later, the EDA software would be made available to the fabless designers and IDMs to actually implement and design software algorithms on the technology hardware.

These embodiments simplify this entire process for the purpose of testing at the equipment manufacturer. Therefore, full PDK libraries are not needed to perform this testing. Instead, a small set of PDK-lite cells 212 may be designed for testing the effect of the material/process change 110. Because only a relatively small number of changes have been made by the material/process change 110, a corresponding relatively small number of changes need to be made to an existing PDK library. Instead of building on top of a bloated PDK library, the software can map the changes to the existing cell that would result from the material/process change 110. A simplified version of the PDK cell may then be used with only a small number of changes related to the specific parameters that are affected by the material/process change 110. Some embodiments may use abstracted values for a given device without losing accuracy in the end result simulations.

The same process may be used to generate standard cell libraries from the PDK-lite cells. Instead of the months-long manual process of designing a library of standard cells, a "lite" version of the relevant standard cells may be generated. Again, the abstracted values from the process library 204 and/or the materials library 206 may be used to generate the lite version of the standard cells. For example, the materials library may include values related to material characteristics, such as dielectric constants and resistivities of different cereals. The process library may include process conditions such as deposition thickness and anneal temperature. These values from the material/process libraries may be abstracted at the standard cell level as delay, power, rise and fall time, and/or other cell characteristics. These new standard cells can then be substituted into the block level design 122 and the full chip SoC design 124, and the PPAC validation can be carried out to determine how the material/process change 110 affects the system-level design. Additionally, some embodiments may also test various algorithms 126, such as AWL algorithms, to determine the impact on the software operation of the material/process change 110. The lite version of the standard cells and/or the lite version of the PDK library may be limited to features that are required for this early-stage exploration. For example, the lite library may be generated to include only cells that are affected by the material/process change and that are required in the system/SoC design. These cells may be generated as simple cells that include only the required characteristics rather than being layered on top of a complete set of cells from a previous PDK library. It should be emphasized that the material/process innovations that are simulated up through the system-level and algorithm validation is made possible without any significant loss of accuracy. Using abstracted values to generate the compact models, lite standard cells, and lite PDK library have been found to generate very accurate results at the system level.

It should be appreciated that the specific steps illustrated in FIG. 2 provide particular methods of evaluating changes evaluating material/process changes in a semiconductor manufacturing process according to various embodiments. Other sequences of steps may also be performed according to alternative embodiments. For example, alternative embodiments may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3:
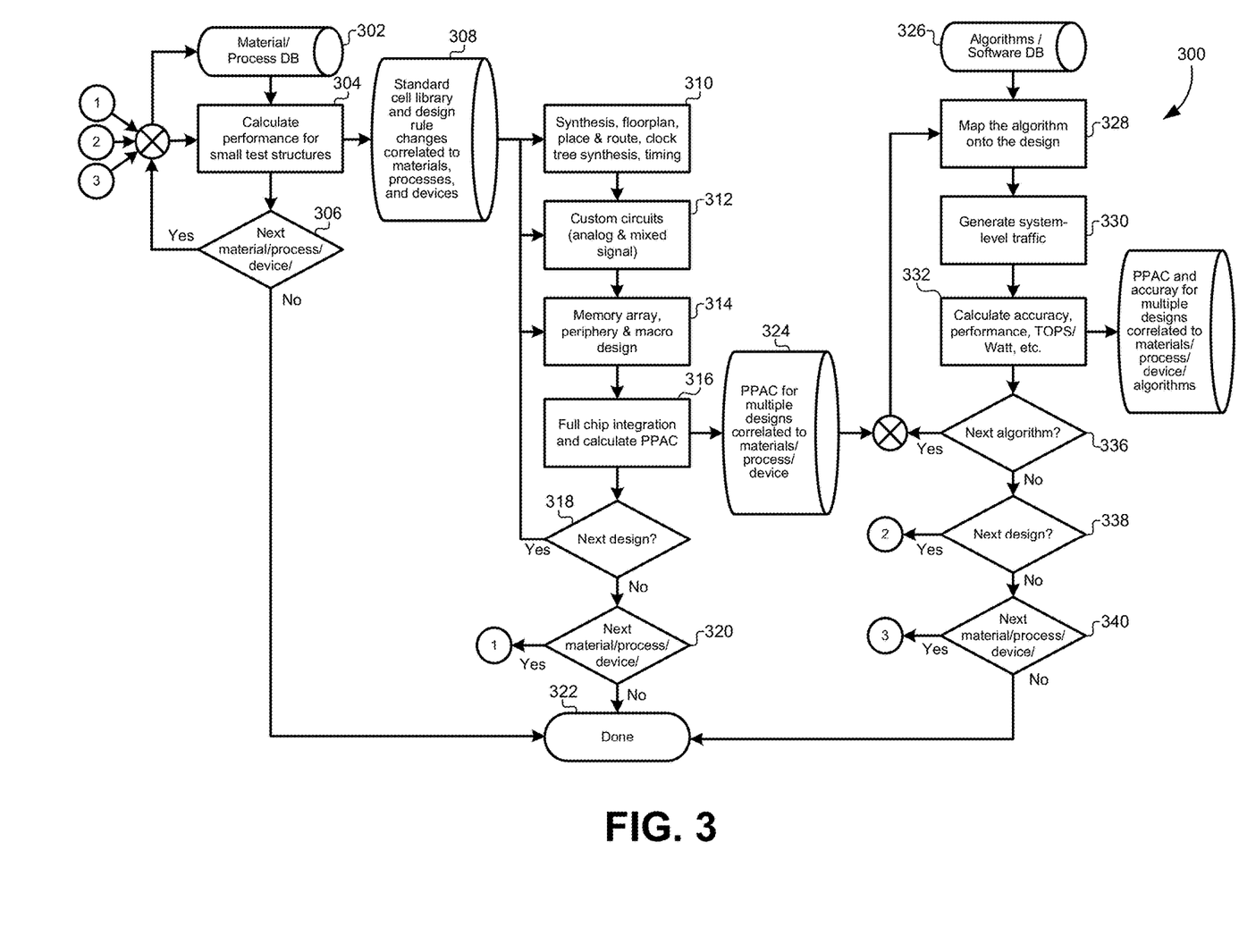
FIG. 3 illustrates a flowchart of a method for performing a full system evaluation for material/process changes with short-loop sub evaluations at incremental stages, according to some embodiments.

FIG. 3 illustrates a flowchart 300 of a method for performing a full system evaluation for material/process changes with short-loop sub evaluations at incremental stages, according to some embodiments. This method includes a number of short-loop validations that test the material/process change at each stage of the manufacturing and circuit design pipeline in a single process. This allows the method to determine at each significant checkpoint whether the change has caused the primitive/simple device, PDK library, standard cell, circuit, and/or system to exhibit unsatisfactory performance with regard to, for example, PPAC requirements. In each short-loop validation, the system can determine whether the current material/process change is acceptable, or whether a new change should be iterated.

The method may first translate any material/process changes into values stored in the material/process database 302 as described above. The remaining steps of the method may draw from the material/process database 302 to retrieve these values as needed through the evaluation process. This database may include characteristics of the materials and processes used to construct small test structures. The method may then calculate performance metrics for the small test structures 304. At this point, a first evaluation can be made to determine whether the material/process change stored in the material/process database 302 has caused the small test structure to perform according to an acceptable threshold. For example, the method may test the voltage, current, capacitance, etc., characteristics of the small test structure. The test structures may include transistors, ring oscillators, NAND gates, and/or other simple circuits. The process may then iterate through additional material/process changes or additional test structure devices and perform a similar evaluation process on each. This short-loop optimization allows a decision to be made early in the process as to whether the proposed material/process changes will be acceptable. It also allows new materials to be tested as alternatives in rapid succession.

As described above, for material/process changes that pass the evaluation for the small test structures, a lite standard cell library or lite embedded memory structure may be generated automatically from the material/process database 302. To continue the full system testing process, the method may include generating any of the necessary components for synthesis, floor planning, place and route, clock tree synthesis, circuit timing, etc. (310). These may be used to generate custom circuits, such as analog, digital, and mixed-signal circuits (312). For memory elements, memory arrays can be generated along with macro-cell designs (314). Finally, any or all of these components may be assembled in a full chip integration design, and an evaluation can be made as to whether the design passes the PPAC requirements (316). At this stage, another short-loop optimization decision can be made as to whether the effect of the material/process change on a larger system falls within an acceptable range. If not, then a decision 320 can be made to iterate to a different material/process change. Multiple designs may be tested 318 until each design has been validated using the new material/process change. A database 324 can store results and/or designs for the system that have passed the PPAC requirements. Multiple material/process changes may be evaluated, and a set of candidate or acceptable material/process changes may be saved to continue the evaluation going forward.

Finally, a third optimization loop may be executed by implementing software algorithms on the digital systems. Various software algorithms can be retrieved from a database 326 and mapped onto the design of the tested systems 328. System-level traffic can be generated to test the algorithm 330, and the system can calculate the accuracy and performance of the circuit (332). Again, the performance of the algorithm can be validated in comparison to multiple metrics, including PPAC requirements. This final optimization loop can iterate through multiple algorithms (336), multiple system designs (338), and/or multiple material/process changes (340) if the performance of the algorithm is not satisfactory. This step may also compare results from multiple designs to determine an optimal material/process change from a set of proposed material/process changes.

It should be appreciated that the specific steps illustrated in FIG. 3 provide particular methods of evaluating changes evaluating material/process changes in a semiconductor manufacturing process according to various embodiments. Other sequences of steps may also be performed according to alternative embodiments. For example, alternative embodiments may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
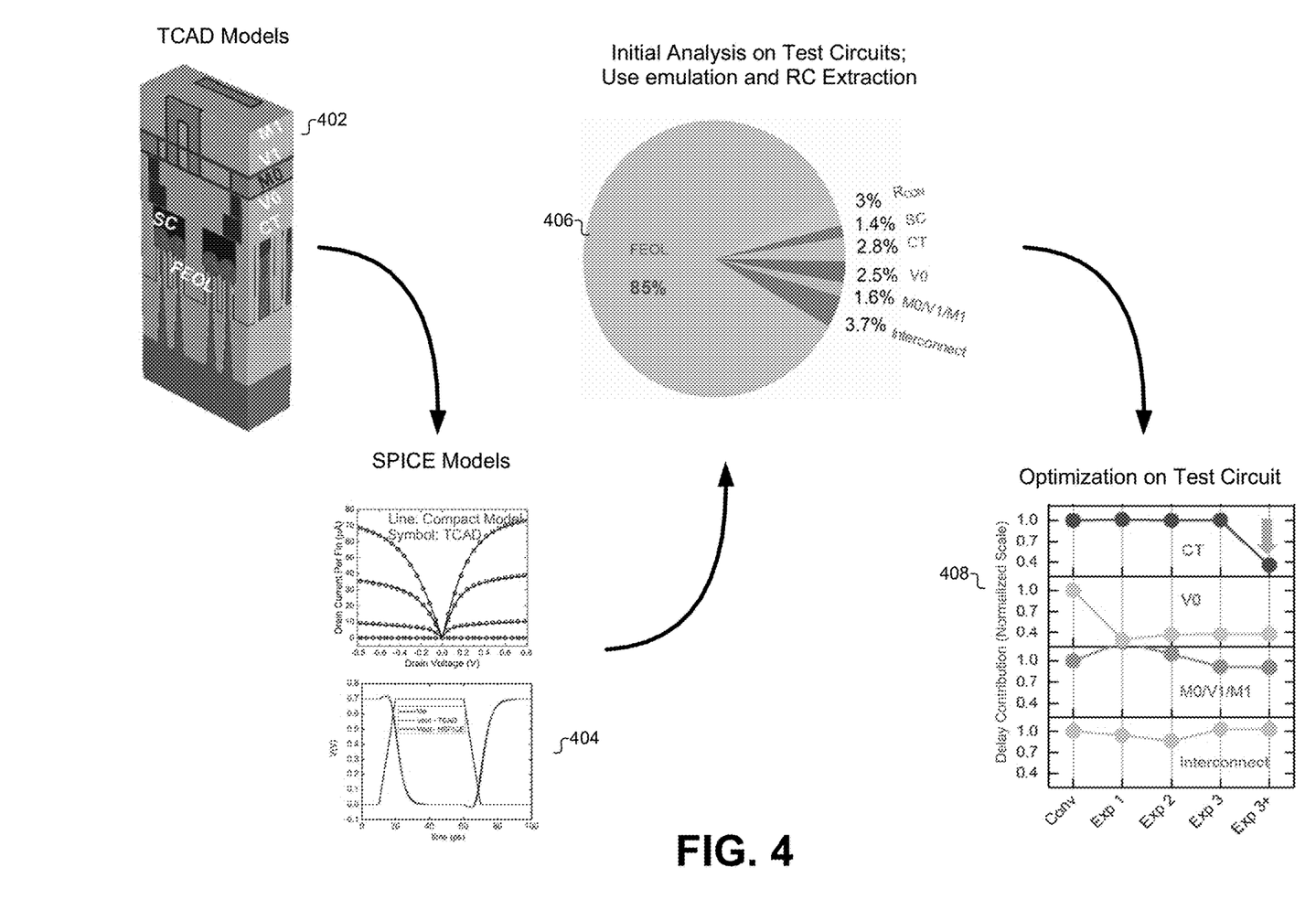
FIG. 4 illustrates an example of a short-loop optimization using the integrated testing workflow described above in FIG. 3, according to some embodiments.

FIG. 4 illustrates an example of a short-loop optimization using the integrated testing workflow described above in FIG. 3, according to some embodiments. In this example, a short-loop optimization cycle may be completed up to the small-circuit test on a circuit such as a transistor. First, a TCAD model 402 may be generated that includes all of the resistances and capacitances that result from connecting primitive devices/structures together. For example, sources, drains, gate electrodes, oxides, and so forth, may generate parasitic capacitances as they are connected to form transistor circuits. The TCAD model 402 captures these capacitances in a silicon layout. This model may be built in TCAD using rules that are applicable to each of the N, N+1, N+2, etc., technology iterations (e.g., 7 nm, 5 nm, 3 nm, etc.).

The TCAD model 402 may then be used to generate a SPICE model. The compact model described above may be used as part of the SPICE simulation to simulate the performance of the circuit (e.g., the transistor) and generate current, voltage, timing, and other electrical characteristics for the circuit. At this point, the simulations in both TCAD and SPICE can serve as a first checkpoint to determine whether the material/process change has affected the performance of the circuit in an acceptable manner. In some embodiments, the simulation data from TCAD may be used as the standard, and the SPICE simulation data may be compared to the TCAD simulation data. If the SPICE simulation data is close to the TCAD simulation data within a threshold amount, then the spice simulation can be used afterward to test the circuit. For example, test data 406 may be generated from either of the models 402, 404 for evaluation purposes.

Note that the TCAD model 402 illustrates the various levels of material deposition that may be used to form the transistor. This may include the metal 1 layer (M1), the via 1 layer (V1), the contact layer (CT), and so forth. The TCAD model 402 captures all of the resistances and capacitances that may be generated by the layout of the circuit. This allows the equipment manufacturer to make changes to the layout of the circuit. For example, in FIG. 4 at least five different sets of test data have been generated as illustrated in the optimization graph 408. The first experiment used the conventional design of the transistor, while each of the subsequent experiments (e.g., Exp 1, Exp 2, etc.) implemented one or more material/process changes used to generate the TCAD model 402 and/or the spice model 404. The final experiment (Exp 3+) shows the most improvement in the delay contributed by the CT layer of the circuit. By performing multiple test using different types of material/process changes, this short-loop optimization cycle can reveal the best changes for the performance of the small circuit. This can also reveal at an early stage material/process changes that are likely to have the greatest effect on system-level performance later on in the process.

Figure 5:
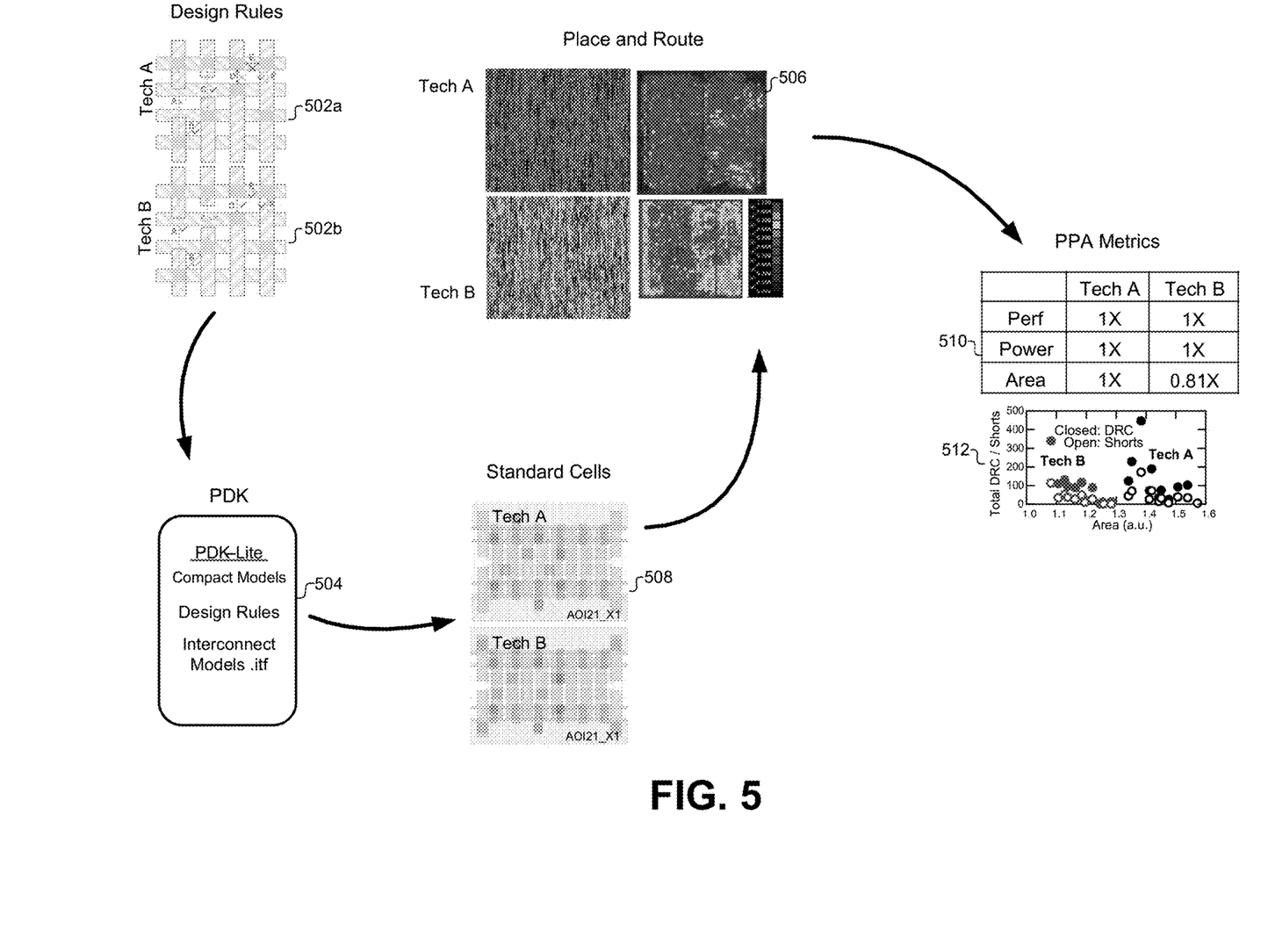
FIG. 5 illustrates an example of a second short-loop optimization to translate the technology features into design rules, and then into a lite PDK library, according to some embodiments.

FIG. 5 illustrates an example of a second short-loop optimization to translate the technology features into design rules, and then into a lite PDK library, according to some embodiments. Different technologies affect the design rules that are implemented in different ways. In this example, two different design rules may be proposed by the system for evaluation. The "Tech A" design rules 502a may be compared to the "Tech B" design rules 502b. By way of comparison, the "Tech B" design rules 502b offer tighter back end of line (BEOL) design rules due to improved material design, process optimization, and integration proposed in the initial steps of this process described above.

The effect on design rules and interconnect models may be captured in the corresponding PDK 504 for each of the design rules 502a, 502b. For each of these design rules 502a, 502b, a PDK-lite may be generated that includes compact models, the design rules, and interconnect models for generating each of the circuit elements in the EDA software. Next, the system may automatically generate a set of standard-lite cells 508. Different standard cells may be generated for each of the different technologies that are being tested. As described above, changes to the design rules can be used to make small changes to the existing standard cells to generate the standard-lite cells 508.

Next, circuits may be generated that use the standard cells 508 and a place and route 506 for each of the different technologies can be generated. In this example, the interconnects of Tech B are much denser, and the heat maps illustrated for the place and route 506 in FIG. 5 illustrate the relative density between Tech A and Tech B. This allows the circuit of Tech B to be implemented in a much smaller footprint in the semiconductor circuit. Next, the PPA metrics 510 can be compared to determine which technology is more effective by comparison. As illustrated in FIG. 5, the PPA metrics 510 show that Tech B is able to offer a 20% reduction in circuit area without significantly negatively affecting the performance or power metrics of the circuit. Error results 512 can also be compared between the two technologies. In this example, Tech B results in fewer design rule check (DRC) errors than Tech A. Again, this short-loop optimization is able to quickly assess the effect of a material/process change in a technology as it is propagated forward through the design process into actual placed, routed, and implemented systems.

Figure 6:
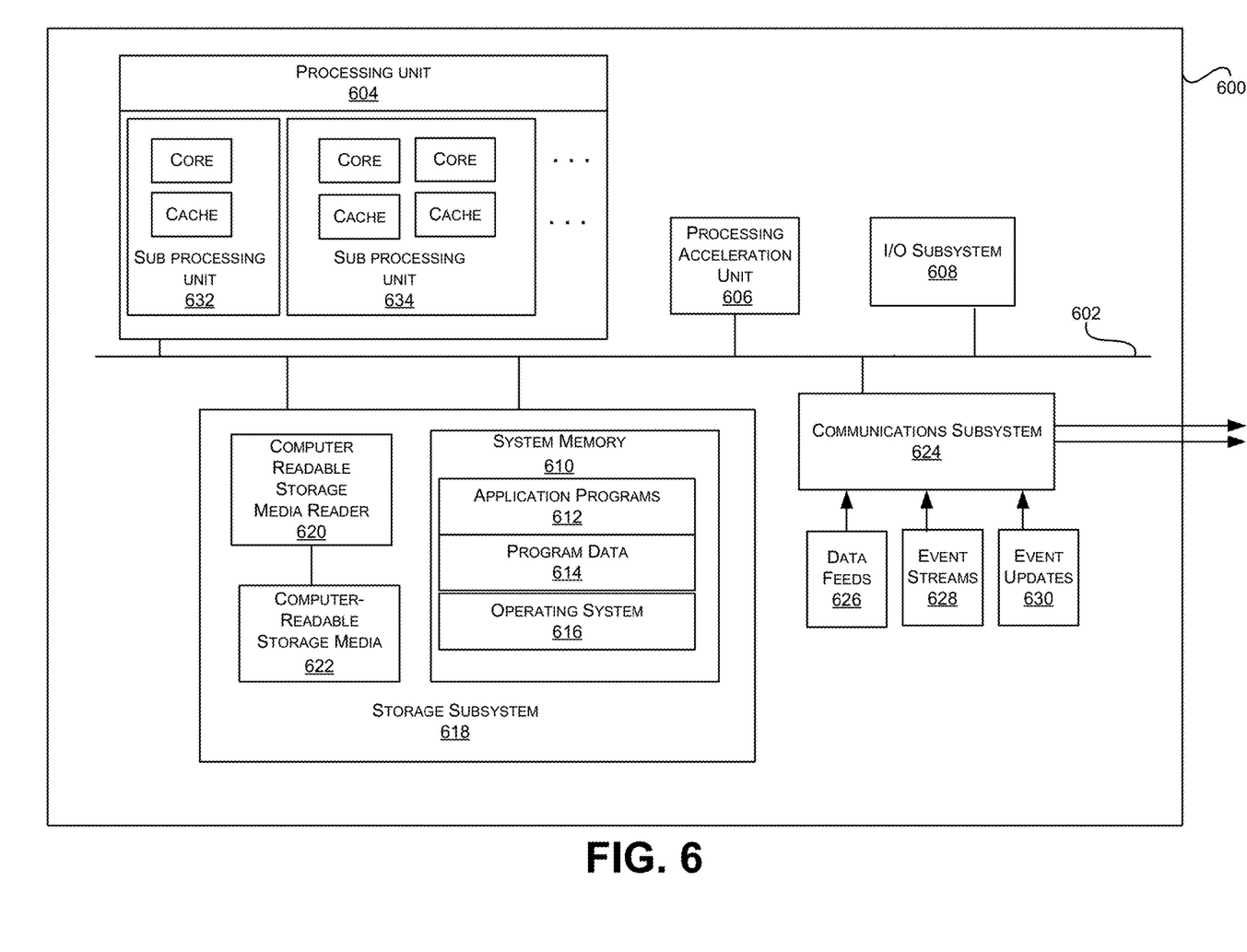
FIG. 6 illustrates an example computer system, in which various embodiments may be implemented.

FIG. 6 illustrates an exemplary computer system 600, in which various embodiments may be implemented. The system 600 may be used to implement any of the computer systems described above. As shown in the figure, computer system 600 includes a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 includes tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which can be implemented as one or more integrated circuits (e.g., a conventional microprocessor or microcontroller), controls the operation of computer system 600. One or more processors may be included in processing unit 604. These processors may include single core or multicore processors. In certain embodiments, processing unit 604 may be implemented as one or more independent processing units 632 and/or 634 with single or multicore processors included in each processing unit. In other embodiments, processing unit 604 may also be implemented as a quad-core processing unit formed by integrating two dual-core processors into a single chip.

In various embodiments, processing unit 604 can execute a variety of programs in response to program code and can maintain multiple concurrently executing programs or processes. At any given time, some or all of the program code to be executed can be resident in processor(s) 604 and/or in storage subsystem 618. Through suitable programming, processor(s) 604 can provide various functionalities described above. Computer system 600 may additionally include a processing acceleration unit 606, which can include a digital signal processor (DSP), a special-purpose processor, and/or the like.

I/O subsystem 608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 600 may comprise a storage subsystem 618 that comprises software elements, shown as being currently located within a system memory 610. System memory 610 may store program instructions that are loadable and executable on processing unit 604, as well as data generated during the execution of these programs.

Depending on the configuration and type of computer system 600, system memory 610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 604. In some implementations, system memory 610 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the ROM. By way of example, and not limitation, system memory 610 also illustrates application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 618 may also provide a tangible computer-readable storage medium for storing the basic programming and data constructs that provide the functionality of some embodiments. Software (programs, code modules, instructions) that when executed by a processor provide the functionality described above may be stored in storage subsystem 618. These software modules or instructions may be executed by processing unit 604. Storage subsystem 618 may also provide a repository for storing data used in accordance with various embodiments.

Storage subsystem 600 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for temporarily and/or more permanently containing, storing, transmitting, and retrieving computer-readable information.

Computer-readable storage media 622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 600.

By way of example, computer-readable storage media 622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to connect to one or more devices via the Internet. In some embodiments communications subsystem 624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

In some embodiments, communications subsystem 624 may also receive input communication in the form of structured and/or unstructured data feeds 626, event streams 628, event updates 630, and the like on behalf of one or more users who may use computer system 600.

By way of example, communications subsystem 624 may be configured to receive data feeds 626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 624 may also be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments. It will be apparent, however, to one skilled in the art that embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of various embodiments as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of various embodiments are described with reference to specific embodiments thereof, but those skilled in the art will recognize that not all embodiments are limited thereto. Various features and aspects of the above-described embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method for evaluating effects of semiconductor material or process changes on software algorithms, the method comprising:
   receiving, by one or more computing systems, a material or process change for a semiconductor manufacturing process;
   translating, by the one or more computing systems, the material or process change into a database of characteristics;
   generating, by the one or more computing systems, primitive circuit structures using the database of characteristics;
   performing, by the one or more computing systems, an electrical characterization of the primitive circuit structures;
   providing, by the one or more computing systems, an output of the electrical characterization to a script to generate compact models;
   generating, by the one or more computing systems, a lite version of standard cells;
   generating, by the one or more computing systems, a digital system based on the lite version of the standard cells; and
   evaluating, by the one or more computing systems, a performance of a software algorithm on the digital system to determine an effect of the material or process change for the semiconductor manufacturing process.

2. The method of claim 1, wherein the primitive circuit structures comprise a transistor.

3. The method of claim 2, wherein performing the electrical characterization of the primitive circuit structures comprises generating current and voltage characteristics for the transistor.

4. The method of claim 1, further comprising performing, by the one or more computing systems, a Technology Computer-Aided Design (TCAD) simulation of the primitive circuit structures.

5. The method of claim 4, further comprising:
   generating, by the one or more computing systems, circuit models of the primitive circuit structures using the database of characteristics and the TCAD simulation; and
   performing, by the one or more computing systems, a circuit simulation of the circuit models.

6. The method of claim 5, further comprising:
determining, by the one or more computing systems, that the material or process change for the semiconductor manufacturing process is acceptable based on results of the circuit simulation of the circuit models.

7. The method of claim 1, further comprising:
receiving, by the one or more computing systems, a plurality of material or process changes for the semiconductor manufacturing process;
translating, by the one or more computing systems, the plurality of material or process changes into the database of characteristics;
generating, by the one or more computing systems, additional primitive circuit structures using the database of characteristics for each of the plurality of material or process changes;
simulating, by the one or more computing systems, the additional primitive circuit structures; and
identifying, by the one or more computing systems, acceptable material or process changes in the plurality of material or process changes based on results of simulating the primitive circuit structures.

8. A system comprising:
one or more processors;
one or more memory devices comprising instructions that, when executed by the one or more processors, cause the one or more processors to perform operations comprising:
receiving a material or process change for a semiconductor manufacturing process;
translating the material or process change into a database of characteristics;
generating primitive circuit structures using the database of characteristics;
performing an electrical characterization of the primitive circuit structures;
providing an output of the electrical characterization to a script to generate compact models;
generating a lite version of standard cells;
generating a digital system based on the lite version of the standard cells; and
evaluating a performance of a software algorithm on the digital system to determine an effect of the material or process change for the semiconductor manufacturing process.

9. The system of claim 8, wherein the primitive circuit structures comprise a memory film stack.

10. The system of claim 9, wherein the lite version of the standard cells comprising a memory array.

11. The system of claim 8, wherein the compact models comprise a ring oscillator.

12. The system of claim 11, wherein the operations further comprise:
testing a performance of the ring oscillator to determine Power-Performance-Area-Cost (PPAC) characteristics; and
determining that the performance of the ring oscillator is acceptable before generating the lite version of the standard cells.

13. The system of claim 8, wherein the lite version of the standard cells omits features that are not required for the digital system.

14. The system of claim 8, wherein the software algorithm comprises an Artificial Intelligence (AI) and/or Machine Learning (ML) algorithm.

15. A non-transitory computer-readable medium comprising instructions that, when executed by one or more processors, cause the one or more processors to perform operations comprising:
receiving a material or process change for a semiconductor manufacturing process;
translating the material or process change into a database of characteristics;
generating primitive circuit structures using the database of characteristics;
performing an electrical characterization of the primitive circuit structures;
providing an output of the electrical characterization to a script to generate compact models;
generating a lite version of standard cells;
generating a digital system based on the lite version of the standard cells; and
evaluating a performance of a software algorithm on the digital system to determine an effect of the material or process change for the semiconductor manufacturing process.

16. The non-transitory computer-readable medium of claim 15, wherein the operations further comprise:
generating a lite version of a Process Design Kit (PDK) using the lite version of the standard cells.

17. The non-transitory computer-readable medium of claim 16, wherein cells in the PDK use abstracted values extracted from the database of characteristics.

18. The non-transitory computer-readable medium of claim 16, wherein the lite version of the PDK may include only cells that are affected by the material or process change for the semiconductor manufacturing process.

19. The non-transitory computer-readable medium of claim 15, wherein the digital system comprises a processor.

20. The non-transitory computer-readable medium of claim 15, wherein the operations further comprise conducting at least two short-loop optimization tests before generating the digital system to test Power-Performance-Area-Cost (PPAC) characteristics of the primitive circuit structures and the lite version of the standard cells.

* * * * *